UNITED STATES PATENT OFFICE.

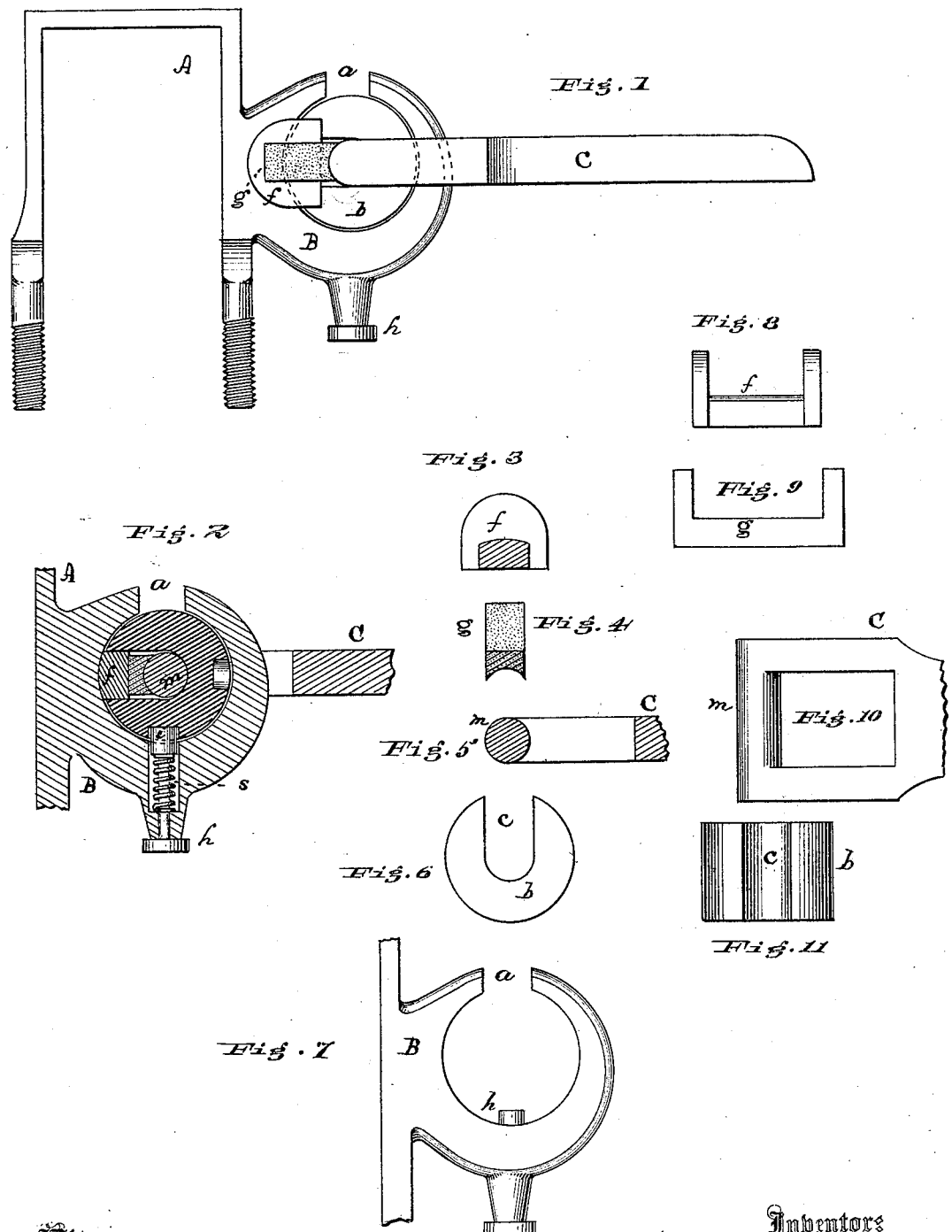

EBEN PAGE, OF APPLETON, ASSIGNOR OF ONE-HALF HIS RIGHT TO MARK ENGLISH, OF GREEN BAY, WISCONSIN.

IMPROVEMENT IN THILL-COUPLINGS.

Specification forming part of Letters Patent No. 178,459, dated June 6, 1876; application filed March 17, 1876.

*To all whom it may concern:*

Be it known that I, EBEN PAGE, of Appleton, Outagamie county, State of Wisconsin, have invented a new and useful Improvement in Shaft and Pole Couplings for Carriages, of which the following is a full description, reference being had to the accompanying drawings, in which—

Figure 1 is a side elevation. Fig. 2 is a central vertical section of the same, and Figs. 3 to 11 are details thereof.

The object of my invention is to provide a safe and cheap coupling device for the shafts of carriages, one which can be conveniently used, and so made that the parts which are liable to wear can be easily replaced.

In the drawings, A represents a clip, which is to be secured to the axle as usual. B is a socket permanently connected with the clip A. The clip A and socket B can be adapted to any axle, and may be made of wrought-iron, these two parts being made together. $a$ is an opening in the top of the rim of the socket A. $b$ is another socket, designed to receive the shaft-iron. It is inserted in the socket A from the side, and can be easily rotated therein. It has an opening, $c$, upon one side to receive the shaft-iron, and this opening should extend a little beyond the center of $b$. C is the iron upon the end of the shaft, adapted to be inserted in the opening $c$ in $b$, $m$ being the part so inserted. $f$ is a gib. $g$ is a piece of rubber inserted between the gib and the end of C to prevent rattling. $h$ is a spring-bolt, the end of which enters a recess in $b$ to aid in preventing it from turning; and $i$ is the head of the bolt. $s$ is a spring.

To connect the shaft-iron with the vehicle the socket $b$ is brought into such position that openings $c$ and $a$ register; then the gib $f$ and the rubber $g$, if used, are to be inserted through the opening $a$ after the shaft-iron has been inserted in its place. The socket $b$, the gib, and the rubber are then to be turned around to the position shown in Figs. 1 and 2. To remove the shafts this operation is to be reversed.

A carriage-pole may be provided with irons similar to C, and either the shafts or the pole can be used, as may be desired, and they can be interchanged very easily.

I do not regard the spring-bolt as a necessity, though it is an additional safety device. By making the opening $c$ extend beyond the center of $b$, as described, the draft will, in use, prevent the socket $b$ from turning in B, so as to permit the shaft-iron C to bound out, and if, in backing, the part $b$ should turn a little in B, (the bolt being omitted,) the draft would again restore it to its proper position. A gib of suitable size can be used without the anti-rattler $g$, and when this part is used I do not confine myself to rubber, as any other suitable known material may be used.

Should any of the parts become useless from wear they can be replaced at a slight expense.

When the spring-bolt is used the bolt must be withdrawn from the recess in $b$ before $b$ can be turned in B.

The inner socket $b$ and the gib may be made of malleable cast-iron. The iron C is best made of wrought-iron, and may be welded to the ordinary shaft-iron. When in use the part $m$ of the iron C turns in the socket $b$, $m$ being round.

I do not claim, broadly, two sockets, one rotating in the other and adapted to receive a shaft-iron.

What I claim as new, and desire to secure by Letters Patent, is as follows:

1. The clip A, provided with a socket, B, having an opening, $a$, in combination with the socket $b$, having an opening, $c$, and the gib $f$, all constructed and operating substantially as and for the purposes set forth.

2. The combination of the clip A, sockets B $b$, having openings $a$ $c$, the gib $f$, rubber $g$, and bolt $h$, all constructed and operating substantially as and for the purposes specified.

3. The clip A and sockets B $b$, adapted to receive the shaft-iron C, in combination with such shaft-iron C and the gib $f$, substantially as and for the purposes specified.

EBEN PAGE.

Witnesses:
E. J. MAUGER,
WM. KENNEY.